United States Patent [19]

Felesky

[11] Patent Number: 4,559,015
[45] Date of Patent: Dec. 17, 1985

[54] METHOD AND MEANS OF TESTING AND REFINING BICYCLE RIDING SKILLS

[76] Inventor: Arthur Felesky, 3240 Shelby Dr., Los Angeles, Calif. 90034

[21] Appl. No.: 629,105

[22] Filed: Jul. 9, 1984

[51] Int. Cl.⁴ ............................................. G09B 19/16
[52] U.S. Cl. .................................... 434/61; 200/86 R; 273/1 GA; 273/1 E; 434/255
[58] Field of Search ................ 273/1 G, 1 GA, 1 GC, 273/1 E; 434/247, 255, 258, 261, 61, 339; 200/86 R, 86 A

[56] References Cited
U.S. PATENT DOCUMENTS 564,392 7/1896 Peck ..................................... 273/1 E
3,617,666 11/1971 Brave ................................ 200/86 R Primary Examiner—William H. Grieb

[57] ABSTRACT

A method and means are provided for testing and refining bicycle riding skills by laying on the ground a narrow, long rubber track which, when traversed by a bicycle in a straight line at a maximum, safe speed, triggers a built-in buzzing mechanism which produces an audible signal. A scoring device, capable of being hand held, is attached to the track which provides the rider with an immediate numerical score based on skill versus speed.

3 Claims, 6 Drawing Figures

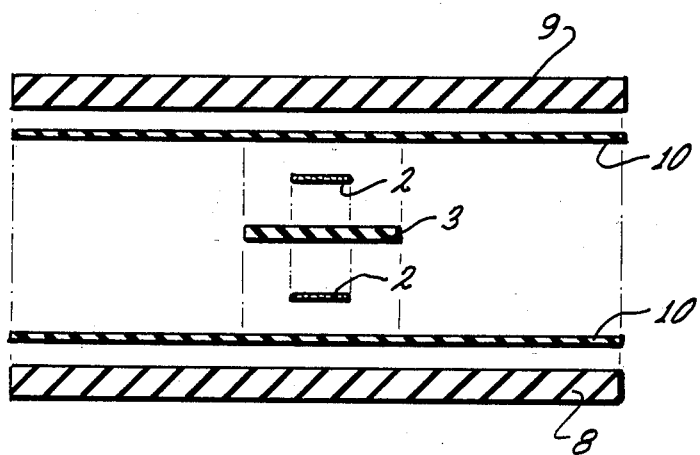
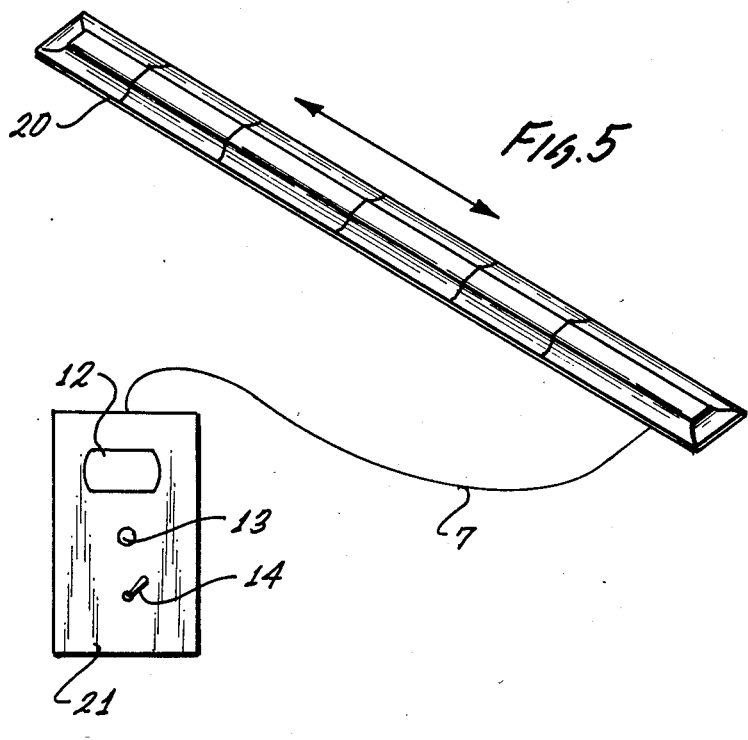

METHOD AND MEANS OF TESTING AND REFINING BICYCLE RIDING SKILLS

The invention relates to a method and means for providing a skill building challenge for bicycle riders. The bicycle rider traverses a narrow (4" wide) twenty foot (20') long rubber track and receives a score based upon speed and accuracy. The scoring mechanism is designed to give a maximum score for accurately traversing the track at a rate of speed not exceeding ten miles per hour (10 m.p.h.). Any attempt to exceed 10 m.p.h. automatically registers a diminished score, thereby discouraging attempts that are unsafe. A buzzer sounds when the bicycle rider is traversing the track accurately.

It is common practice to acquire bicycle riding skills on roads, sidewalks, playgrounds and dirt paths, all of which present dangers, not only to the bicycle rider, but to whomever the rider encounters. The bicycle rider in these areas risks encountering unforeseen intrusions into his path or uneven, dangerous riding surfaces, both of which may cause accidents and injuries.

The bicycle rider also typically relies on his subjective impressions in assessing his bicycle riding skills. Such impressions may be inaccurate, therefore causing the rider to miscalculate his ability to negotiate his bicycle in a dangerous area resulting in an accident and even injury.

The present invention assists a bicycle rider to overcome said disadvantages and drawbacks by the use of a novel rubber track, which is easy to set up and may be placed in areas determined to be absent of potentially hazardous intrusions. In addition, said track includes a buzzer and scoring device which provides the rider with an immediate objective assessment of his skills. Periodic use of the invention should increase the riding skill of a bicycle rider so that he may be better prepared to contend with unexpected dangers.

In the accompanying drawings, an embodiment of the invention is shown, and in said drawings—

FIG. 4 is an enlarged view of a cross section of the track showing the interrelationship of all materials comprising the main body of the track;

FIG. 5 illustrates the entire track system;

Figure 1:
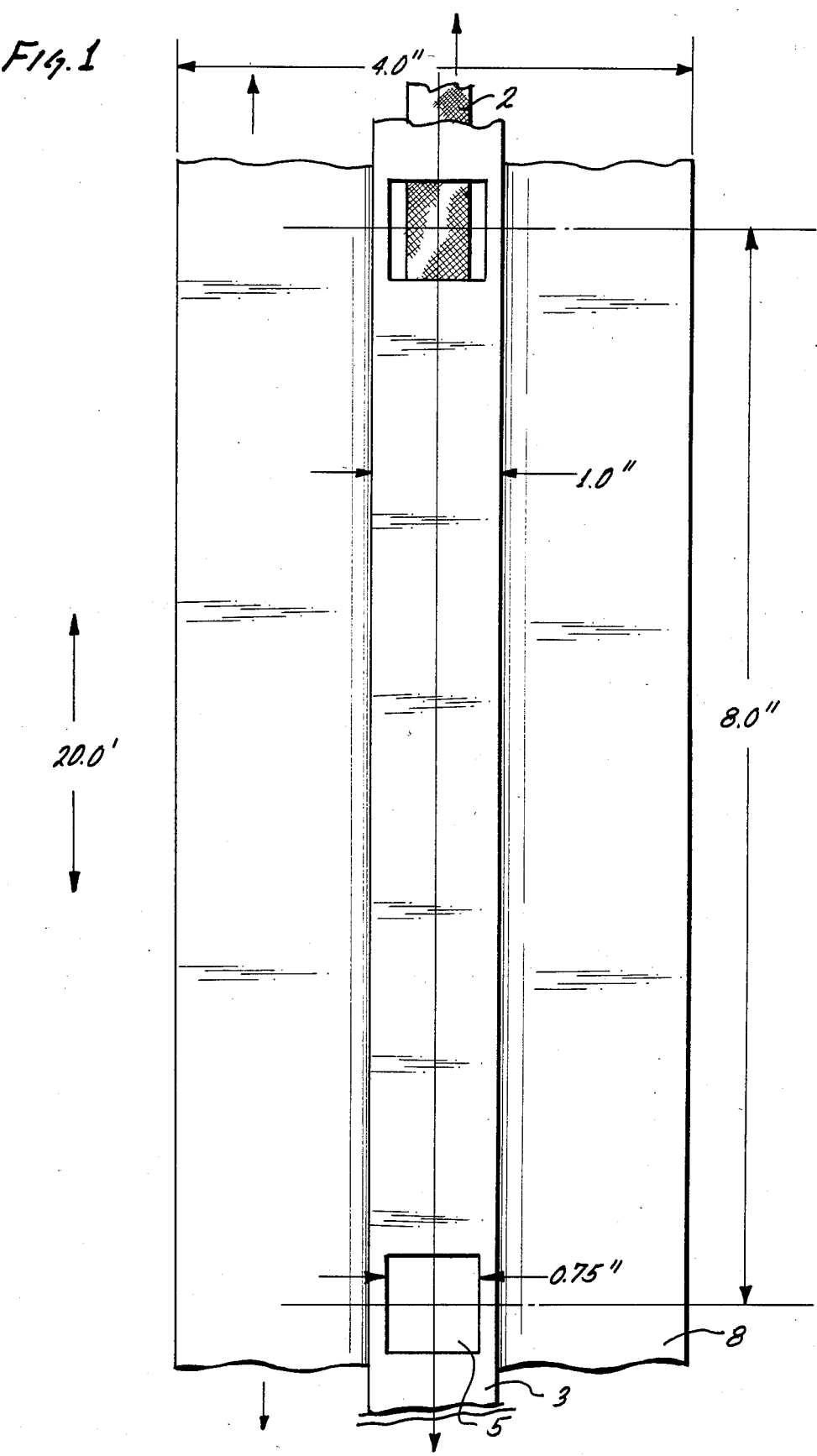
FIG. 1 is a view of an 8" section of the bottom layer of the track from above, without the top layer covering.

FIG. 1 illustrates an 8" section of the 20' track which is representative of the track structure. The track consists of a bottom layer of substrate rubber 8 or vinyl 1/16" to ⅛" thick, 4" wide and 20' long. The top layer of substrate rubber or vinyl 10 (not shown) is identical to the bottom layer and is shown in FIG. 4. A contact strip of conductive surfaced cloth tape 2 or wire mesh 1/16" thick, 0.5" wide and 20' long is placed along the center of the track's bottom layer. An identical strip of conductive surfaced cloth tape or wire mesh (not shown) is placed on top of the foam insulator described below and is shown in FIG. 4. A single layer of low density foam 3 consisting of 97% void space or other compressive low density insulator 1/16" to ⅛" in height (uncompressed), 1" wide and 20' long, is placed along the center of the track on top of the conductive cloth tape and square holes 0.75" by 0.75" (5) are cut into the insulator material every 8", allowing for electrical signal contacts as the bicycle passes over the length of the track. These holes 5 will be referred to as "switch holes".

Figure 2:
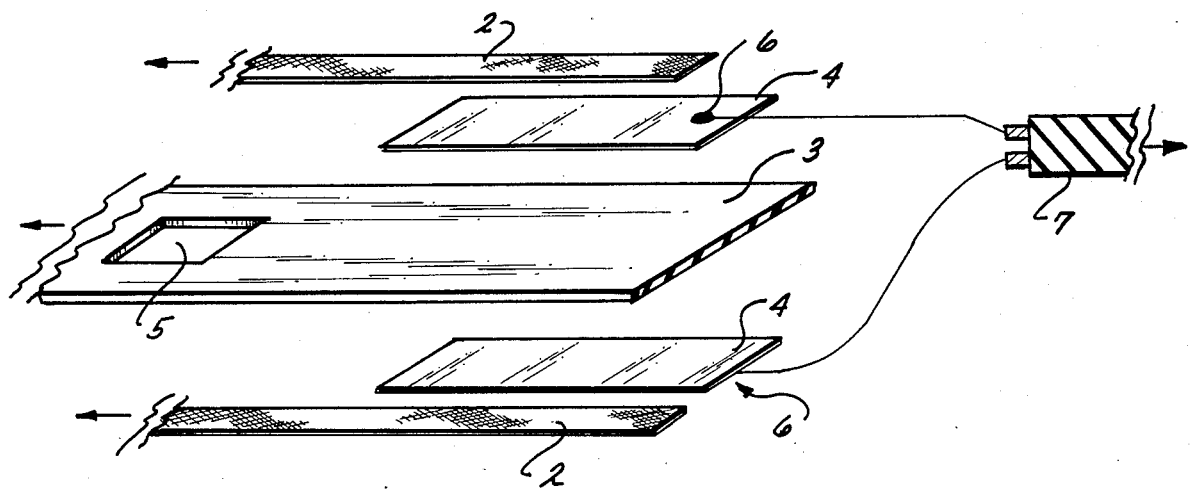
FIG. 2 is an enlarged view of the connection to the signal cable without covering.

FIG. 2 is an enlarged view of the connection to the signal cable, without rubber or vinyl covering. Two pieces of copper foil 0.75" wide, 1/64" to 1/32" thick and 5" long 4, on which two conductor braided 20 gauge wires 7 from the signal cable are soldered 6, are placed on both sides of the layer of insulator material 3. The conductive tapes with one-sided adhesive or metal mesh screens 2 are placed on the opposite sides of the foil strips. The switch holes which are placed at 8" intervals in the 20' length of insulator are represented in 5. The signal cable wires 7 lead from the track to the scoring device as illustrated in FIG. 5.

Figure 3:
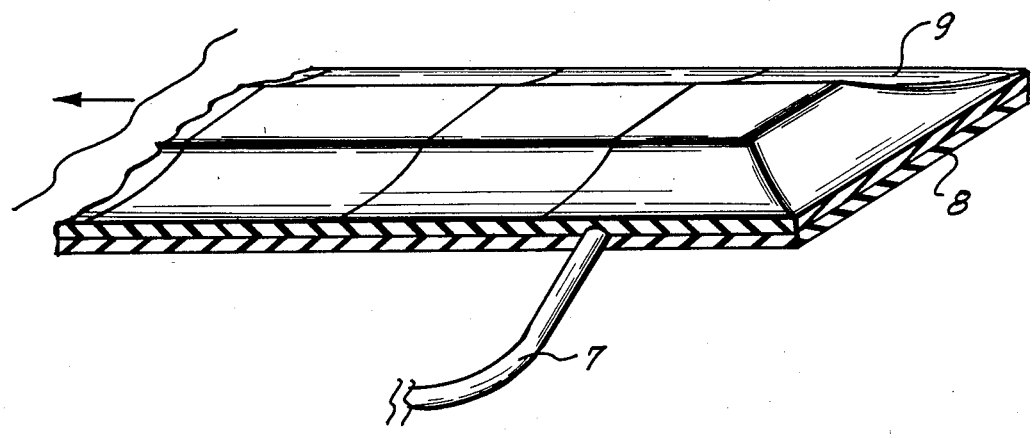
FIG. 3 is an enlarged view of the connection to the signal cable as enclosed and sealed.

FIG. 3 is an illustration of a section of the track, as enclosed and sealed. Shown in the drawing are the top 9 and bottom 8 layers of substrate rubber or vinyl covering and the signal cable wires 7 leading from the track to the scoring device.

FIG. 4 illustrates an enlarged cross-sectional view of the component parts of the track structure. The outer layers of substrate rubber or vinyl (top 9, bottom 8) enclose the component parts which consist of two layers of two-sided, 3m insulation tape 10 which is 4" wide, 20' long and less than 1/32" thick. The layers of tape in turn enclose the two layers of conductive surface tape or wire mesh 2 which enclose the single layer of insulator material 3.

FIG. 5 shows the entire track system (including an unproportionally large drawing of the scoring device 21). The track, completely assembled and enclosed, essentially constitutes a 20' long membrane 20, which is 4" wide. The signal cable wires 7 connect the scoring device to the track. The scoring device 21 is operated by flipping an "on/off" switch 14, pushing a "reset" button 13 before each ride over the track. An LCD display counter device 12 containing Red Lion controls, sub cub 1 displays the rider's score.

Figure 6:
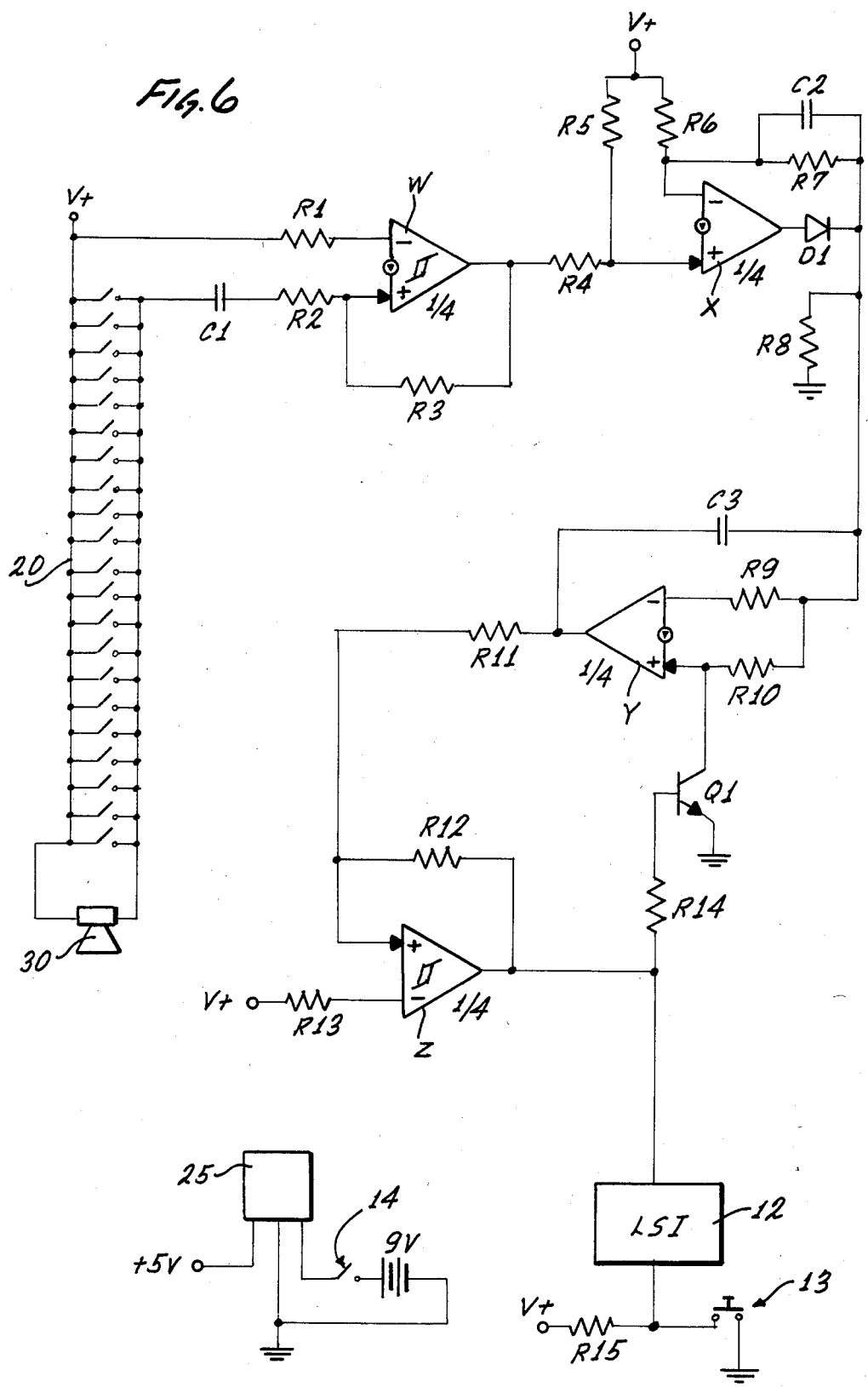
FIG. 6 is a schematic diagram of the scoring device.

FIG. 6 is a schematic diagram of the components of the scoring mechanism and buzzing device. The membranous track 20 is depicted in schematic symbols and the relationship is shown to the buzzing device 30 which is a Piezo Electric buzzer ¾"×¼"×¼" and is activated by switch closures. A Schmidtt trigger W fires the current from the track to a frequency to voltage converter S. The current then travels to a voltage controlled oscillator consisting of an integrator Y and a Schmidtt trigger Z which sends the current to the scoring device. The component valves illustrated in this FIG. 6 consist of fifteen resistors (see below), three condensers (see below), a general signal diode D1 and a general NPN switching transistor Q1. The values for the resistors and power factors for the condensors shown in FIG. G are as follows:

| Resistors | | Condensors | |
| --- | --- | --- | --- |
| R1 | 1.2 m 52 | C1 | .05 pf |
| R2 | 1.0 m 52 | C2 | .68 pf |
| R3 | 1.2 m 52 | C3 | 1.00 pf |
| R4 | 82.0 k 52 | | |
| R5 | 180.0 k 52 | | |
| R6 | 180.0 k 52 | | |
| R7 | 200.0 k 52 | | |
| R8 | 5.1 k 52 | | |
| R9 | 430.0 k 52 | | |
| R10 | 360.0 k 52 | | |
| R11 | 2.0 k 52 | | |

-continued

| Resistors | | Condensors |
|---|---|---|
| R12 | 3.9 k 52 | |
| R13 | 3.6 k 52 | |
| R14 | 470.0 k 52 | |
| R15 | 2.0 k 52 | |

Symbols 12, 13 and 14 represent the scoring device's Red Lion Control LCD counter display, "reset" button and "on/off" switch, respectively. A 5-volt regulator 25 is encased in the scoring device.

I claim:

1. An elongate track structure for use as a bicycle riding track and for testing and refining bicycle riding skills and comprising
   (a) at least two layers of substrate rubber or vinyl which enclose two layers of two-sided insulation tape which in turn enclose two layers of conductive surface tape enclosing a single layer of insulator material, in which square holes are placed at intervals allowing for electrical signal contacts to be made when pressure is placed on said track,
   (b) a means for electrical connections to pass from the track structure to a hand-held scoring device,
   (c) a means for electrical connections to activate a buzzing mechanism built into the track structure,
   (d) a hand-held scoring device which can be manually turned on and automatically activated by pressure on the track to produce a numerical score on an enclosed LCD counter display.

2. The elongate track structure according to claim 1, which constitutes a 20' long membrane track and sends electrical signals to said buzzing mechanism and scoring device.

3. The elongate track structure according to claim 1 including signal cable wires connecting said track structure and scoring device.

* * * * *